United States Patent
Tonhaeuser et al.

(10) Patent No.: US 7,399,157 B2
(45) Date of Patent: Jul. 15, 2008

(54) COOLING MODULE ARRANGEMENT WITH A SEALING ELEMENT

(75) Inventors: Jochen Tonhaeuser, Esslingen (DE); Willi Weber, Mainhardt (DE)

(73) Assignee: Daimler AG, Stuttgart (DE)

(*) Notice: Subject to any disclaimer, the term of this patent is extended or adjusted under 35 U.S.C. 154(b) by 498 days.

(21) Appl. No.: 11/245,943

(22) Filed: Oct. 7, 2005

(65) Prior Publication Data

US 2006/0054304 A1    Mar. 16, 2006

Related U.S. Application Data

(63) Continuation-in-part of application No. PCT/EP04/01954, filed on Feb. 27, 2004.

(30) Foreign Application Priority Data

Apr. 9, 2003    (DE) ................ 103 16 108

(51) Int. Cl.
F03B 11/00    (2006.01)
(52) U.S. Cl. ............... 415/173.3; 277/553; 277/556
(58) Field of Classification Search .......... 415/173.3; 123/41.49; 277/553, 556, 634, 637
See application file for complete search history.

(56) References Cited

U.S. PATENT DOCUMENTS 4,213,426 A    7/1980    Longhouse

FOREIGN PATENT DOCUMENTS

| DE | 37 37 391 | 5/1989 |
|----|-----------|--------|
| EP | 1 143 125 | 10/2001 |
| FR | 1 126 304 | 11/1956 |
| JP | 08 004 530 | 1/1996 |
| WO | WO 98/37319 | 8/1998 |

*Primary Examiner*—Edward Look
*Assistant Examiner*—Dwayne J White
(74) *Attorney, Agent, or Firm*—Klaus J. Bach

(57) ABSTRACT

In a cooling module arrangement with a seal element for a motor vehicle having an engine including a cooling fan with a fan housing component connected to the engine and a fan cowl component connected to a radiator of the motor vehicle with a gap provided between the fan housing and the fan cowl components, wherein a sealing element is connected to one of the components and includes in the area of its free end a circumferential bead, so that, in a pre-installation position, it is firmly held folded back onto the one component so as to facilitate installation of the components but, when unfolded, extends in its operative position across the gap between the components and firmly engages with its free end the other component.

6 Claims, 3 Drawing Sheets

COOLING MODULE ARRANGEMENT WITH A SEALING ELEMENT

This is a Continuation-In-Part Application of International Application PCT/EP2004/001954 filed Feb. 27, 2004 and claiming the priority of German application 103 16 108.2 filed Apr. 9, 2003.

BACKGROUND OF THE INVENTION

The invention relates to a cooling module arrangement with a sealing element for a motor vehicle having a cooling fan enclosed by a fan housing fixed to the engine of the motor vehicle and a fan cowl fixed to the vehicle, with elastic sealing means extending between the fan housing and the fan cowl.

The increasing heat flows due to ever increasing engine outputs and ever greater heat inputs of auxiliary consumers into the cooling system, which have to be dissipated by the cooling system, place ever greater demands on the performance of cooling modules. At the same time the space available for the installation of such cooling modules in motor vehicles becomes more and more restricted.

The use of an axial-flow fan having a small circumferential edge gap affords a compact, practical and commonly known way of improving the through-flow and hence the cooling capacity of the cooling module. For best results, however, it is necessary to seal the gap between the fan cowl fixed to the frame and the fan housing fixed to the engine. Problems arise with this seal, however, due to relative movements between the cooling module firmly supported on the frame, with fan cowl affixed thereto, and the fan housing fixed to the engine, stemming from engine movements and twisting movements of the vehicle, together with deviations of components from the ideal position as a result of component tolerances, which have to be compensated for by a suitable sealing element.

Various sealing elements for overcoming this problem are already known in the state of the art. Thus WO-A-98/37319, for example, discloses a sealing element for the seal between a fan housing and a fan cowl of a cooling module system of a motor vehicle, with one end of the sealing element being fixed to the fan housing and the other end bearing on the outside of the fan cowl. The sealing element is elastic, so that it always bears as tightly as possible on the outside of the fan cowl. In addition, the sealing element has reinforcing extension sections, which project beyond the end of the sealing element facing the fan cowl, so that at least the extension sections remain in contact with the fan cowl at all times, thereby ensuring that in the event of excessive displacements between the fan cowl and the fan housing the sealing element retains its shape without being drawn into the fan cowl and also fulfills a valve function.

Further sealing elements for the seal between a fan cowl and a fan housing of a cooling module system of a motor vehicle are disclosed, for example, by EP-A-1 143 125 and JP-A-08-004530. At their two ends these sealing elements composed of an elastic material are fastened or clamped to the outside of the fan cowl and the outside of the fan housing. In the case of EP-A-1 143 125 the sealing element furthermore has a bellows section to compensate for relative radial movements.

U.S. Pat. No. 4,213,426 furthermore shows such a sealing element composed of an elastic material, which on the one hand is fixed to a radiator frame and on the other faces a periphery of a fan housing with a small gap between them. This sealing element also includes a bellows section to compensate for relative radial movements.

A further problem with sealing elements between the fan cowl and the fan housing is that in order to guarantee their sealing function the conventional sealing elements have a relative large dimension in the axial direction of the cooling module system. This has disadvantages, particularly when assembling the cooling module, owing to the confined space in the engine compartment of a motor vehicle.

It is an object of the present invention therefore to provide a sealing element for a cooling module arrangement of a motor vehicle, which, on the one hand, ensures reliable sealing and, on the other, is easy to install even in confined spaces.

SUMMARY OF THE INVENTION

In a cooling module arrangement with a seal element for a motor vehicle having an engine including a cooling fan with a fan housing component connected to the engine and a fan cowl component connected to a radiator of the motor vehicle with a gap provided between the fan housing and the fan cowl components, wherein a sealing element is connected to one of the components and includes in the area of its free end a circumferential bead, so that, in a pre-installation position, it is firmly held folded back onto the one component so as to facilitate installation of the components but, when unfolded, extends in its operative position across the gap between the components and firmly engages with its free end the other component.

Once it has been attached to the one component (fan cowl or fan housing), the sealing element is folded into its mounting position, in which position it readily affixes itself by way of the peripheral rubber bead, so that a very compact construction is obtained for mounting of the cooling module, which simplifies the mounting appreciably, even in confined spaces. When mounting the cooling module the sealing element can then be swung or sprung open in one simple movement, in order to arrive in its operating position on the periphery of the other component.

In one embodiment of the invention the sealing element has an abutting surface for firm connection to the one component, the fan housing or the fan cowl, by means of a hard-soft joining technique.

In an alternative embodiment of the invention the sealing element, at one end facing the one component, the fan housing or the fan cowl, has at least one projecting element for firm engagement in a corresponding recess provided in the one component.

Preferably, at least one such projecting element of the sealing element is a self-expanding rubber bead. At its end facing the one component, that is the fan housing or fan cowl, the sealing element may furthermore have a hook element for engagement with a corresponding hook element provided on the one component for radially supporting the sealing element on the one component.

The sealing element may be additionally fixed in its mounting position by means of a separate mechanical fixing device.

Further features and combinations of features will become apparent from the following description of the invention on the basis of the enclosed drawings:

DESCRIPTION OF A PREFERRED EMBODIMENT

Figure 1:
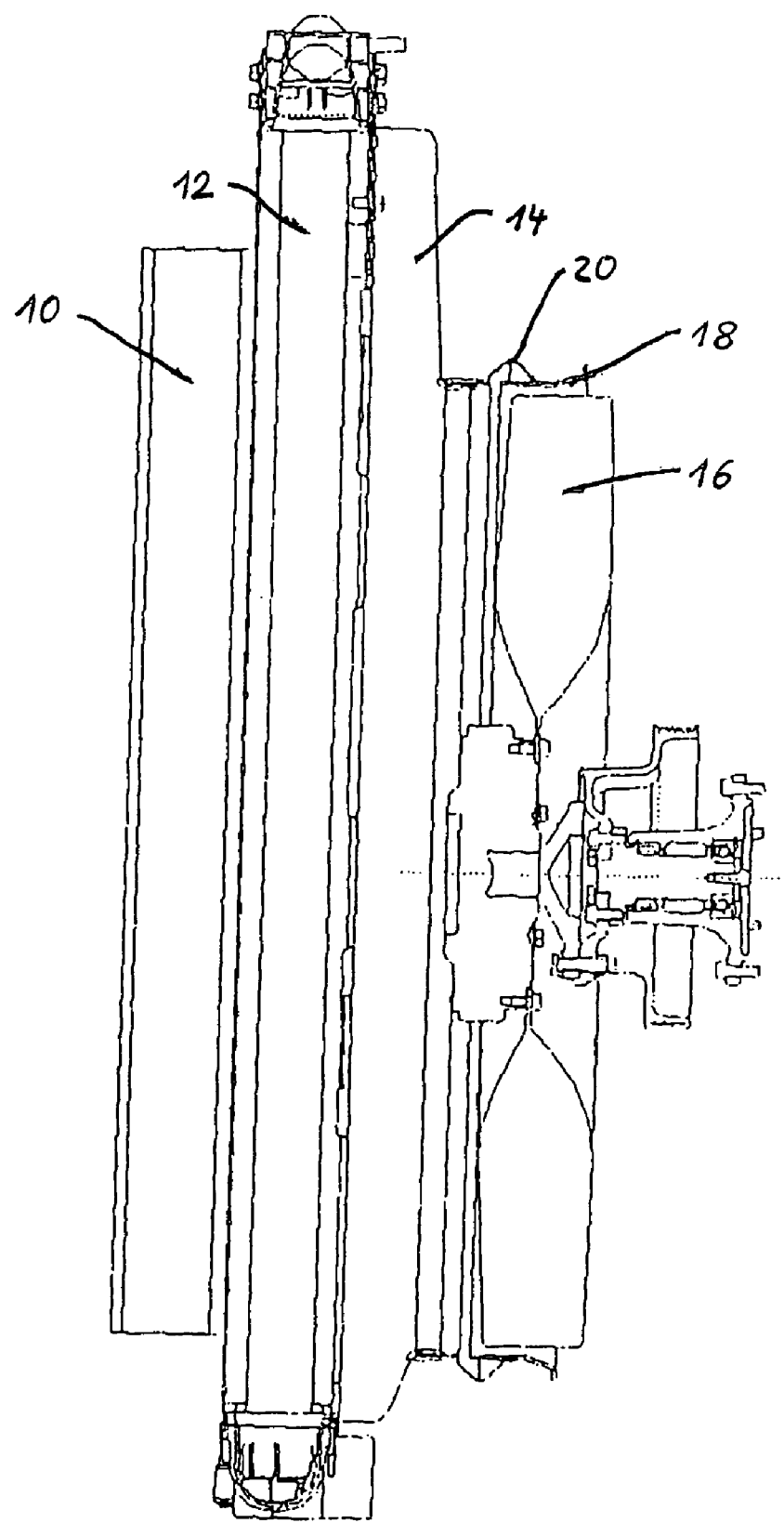
FIG. 1 shows schematically a cooling module system of a motor vehicle including a sealing element according to the present invention.
Figure 2:
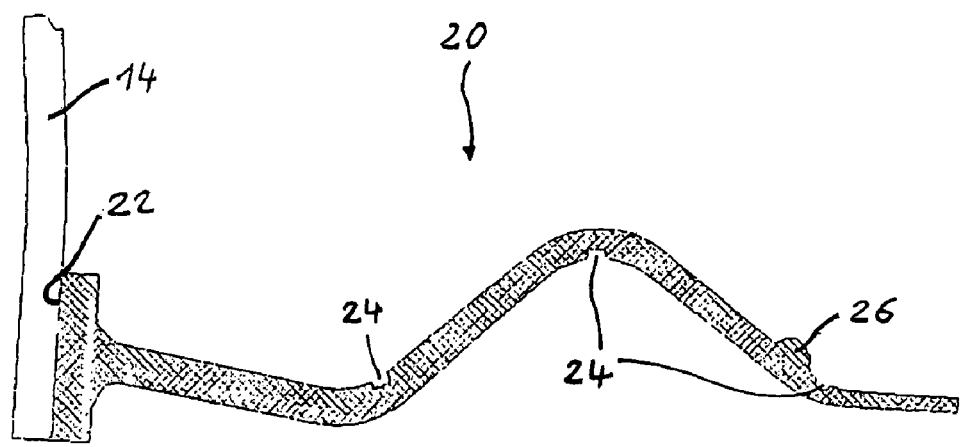
FIG. 2 shows schematically, in a cross-sectional view, a first exemplary embodiment of a sealing element according to the present invention.
Figure 3:
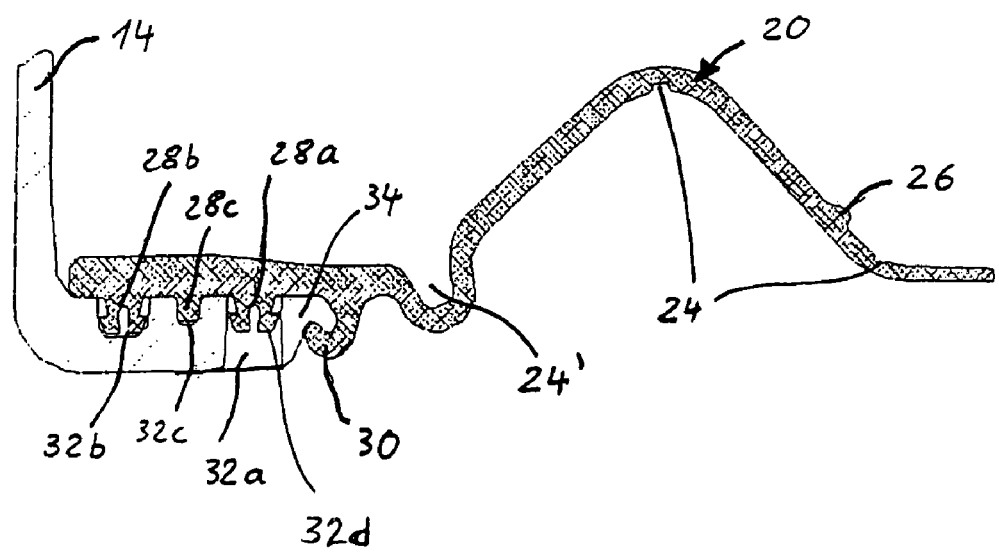
FIG. 3 shows schematically, in a cross-sectional view, a second exemplary embodiment of a sealing element according to the present invention.

FIG. 1 schematically represents the structure of a cooling module system of a motor vehicle, in which a sealing element according to the present invention is advantageously used. FIGS. 2 to 4 then describe the structure and the operating principle of sealing elements according to the invention in more detail.

The cooling module system in FIG. 1 has a cooling module, which is secured to a frame (not shown) of a motor vehicle and which comprises an air intercooler 10, a radiator 12 and a fan cowl 14. The fan cowl 14 adjoins the periphery of the radiator 12 and tapers toward an engine (not shown) of the motor vehicle. An axial-flow fan 16, which is radially completely enclosed by a fan housing 18, is connected to and driven by the engine. The axial-flow fan 16 and the fan housing 18 are firmly mounted on the engine.

Since the structure and the components of such a cooling module system will be sufficiently familiar to the person skilled in the art, a detailed description thereof will not be given here. It will be pointed out, however, that the present invention is not limited to special types of axial-flow fans or special types of radiators.

In order to optimize the air flow through the cooling module 10-14, a sealing element 20 is provided between the fan cowl 14 on the radiator 12 and the fan housing 18 of the axial-flow fan 16. The sealing element 20 is composed of an elastic material such as rubber, for example, in order to compensate for the relative movements between the fan cowl 14, fixed to the frame, and the fan housing 18, fixed to the engine, in response to engine movements. The sealing element 20 is furthermore basically circular corresponding to the design of the cooling module system.

FIG. 2 shows in a sectional side view a first exemplary embodiment of a sealing element 20 according to the invention. The sealing element 20 is fixed with one end of the fan cowl 14, whilst its other end is unattached. In this embodiment the sealing element 20 is fixed to the fan cowl 14 by means of a hard-soft joining technique, that is to say, for example, by molding, welding, vulcanizing or bonding an abutting surface 22 of the sealing element 20 composed of soft rubber material to the fan cowl 14 composed of rigid plastic.

FIG. 2 shows the sealing element 20 in its extended operating position, the free end of the sealing element 20 remote from the fan cowl 14 bearing on the outside of the fan housing 18, not shown in this figure, and being biased toward the bottom of FIG. 2 for the purpose of sealing. As can be seen from FIG. 2, the sealing element 20 has notches 24 (that is to say areas with a reduced material cross-section) at multiple intended bending points, so as to permit folding of the sealing element 20 at these points. With the elastic characteristics of the material of the seal lip 20 the sealing element is biased toward the operating position represented in FIG. 2, in which it is elongated and bears with its end remote from the fan cowl 14 on the periphery of the fan housing 18, forming a seal therewith.

For fixing the sealing element 20 in its folded mounting position, the sealing element 20 is provided with a peripheral rubber bead 26, which is intended to hold the sealing element 20 in its folded mounting position. In addition, the sealing element 20 may also be fixed in its mounting position by means of a separate fixing device (not shown), such as a cord, a clip or a wire, for example.

In a modified exemplary embodiment a soft sealing lip 22 is molded directly onto a hard fan cowl 14, it being possible to dispense with vulcanizing or bonding. In a further modified exemplary embodiment the sealing element 20 and the fan cowl 14 are connected to one another by a square butt joint, that is to say, along the narrow end areas.

In a further exemplary embodiment the fan cowl 14 is provided with at least one perforation, through and behind which portions of the sealing element 20 extend so that they are positively retained.

A second exemplary embodiment of a sealing element 20 according to the invention is illustrated in FIG. 3. The sealing element 20 is likewise represented in its elongated operating position and also has multiple notches 24 at intended bend points and a rubber bead 26 as an integral fixing device. In addition to the notches 24 the sealing element 20 is provided with a hinge-like section 24', which likewise serves as intended bending point.

At its end facing the guide cowl 14 the sealing element 20 is formed with multiple projecting elements 28a, 28b and 28c and a hook element 30, which mesh with corresponding mating elements of the guide cowl 14, in order to produce a fixed and positively interlocking connection between the sealing element 20 and the guide cowl 14.

A first projecting element 28a in the form of a self-expanding rubber bead is snapped into a first recess 32a in the form of a through-opening in the fan cowl 14. The through-opening 32a is at the same time conically tapered in such a way that the opening facing the rubber bead 28a is smaller than the opening remote from the rubber bead 28a, and is provided with a type of barb or retaining lug 32d, so that the self-expanding rubber bead 28a is firmly held in the recess 32a. The conical taper is the reason why the recess 32a is designed as a through-opening, since in its production the fan cowl 14 has to be released from the mold both inwards and outwards. Since the through-opening 32a causes a weakening of the material of the fan cowl 14, however, it is not formed over the entire periphery of the fan cowl 14, but only in isolated segments. In the other segments this opening 32a is designed as a wider slot, in which the rubber bead 28a can engage without any great wedging action. The aforementioned combination of two "types of recess" (through-opening and slot) is necessary for the recess 32a, in order to provide for the fan cowl 14 sufficient strength and on the other hand in order to be able to insert the peripheral rubber bead 28a into the recess over the entire periphery.

A second projecting element 28b is likewise designed as a self-expanding rubber bead and is inserted into a second recess 32b. FIG. 3 here shows a segment of the second recess 32b in the form of the wider slot instead of the through-opening. However, the recess 32b is likewise designed with alternating slot recesses and through-opening recesses, the slots and through-openings of the first and second recess 32a, 32b preferably being staggered, in order to afford the fan cowl 14 sufficient strength.

The rubber beads 28a, 28b in the exemplary embodiment in FIG. 3 are designed to extend around the entire periphery at the seal element 20. Alternatively it is also possible to provide the rubber beads 28a, 28b solely in isolated segments, which correspond to the segments of the through-openings of the recesses 32a, 32b. In this case the slot-like segments of the recesses 32a, 32b could be omitted, which would give the fan cowl 14 greater strength but would lead to a weaker connection between the sealing element 20 and the fan cowl 14. It is possible to compensate for the weaker connection by means of a suitable adhesive, for example.

A third projecting element 28c, which takes the form of a single peripheral projection and which engages in a peripheral third slot-like recess 32c in the fan cowl 14, is provided between the two projecting elements 28a, 28b designed as a rubber bead. This third projecting element 28c serves to absorb axial forces acting on the sealing element 20, for fixing the sealing element 20 on the fan cowl 14 and for sealing the two components off from one another.

A hook-shaped projection 34, in which the hook element 30 of the sealing element 20 engages, is furthermore formed on the edge of the fan cowl 14 facing the sealing element 20. This hook-shaped projection 34 serves to absorb radial forces acting on the sealing element 20 and therefore reduces stressing of the sealing element 20, 28a, 28b, 28c.

The design of the sealing element 20 described above and represented in FIG. 3 allows it to be produced as a cost-effective extruded part. Rapid installation of the sealing element 20 to the fan cowl 14 is moreover possible, since the sealing element 20 can be easily snapped into the periphery of the fan cowl 14, the projecting elements 28a-c of the sealing element 20 preferably snapping into the corresponding recesses 32a-c due to a radially inward bias of the elastic material of the circular sealing element 20.

The working principle of the sealing element 20 according to the invention will now be described in more detail with reference to the second exemplary embodiment shown in FIG. 3. The following explanations also apply analogously, however, to the first exemplary embodiment of the sealing element 20 in FIG. 2.

Figure 4A:
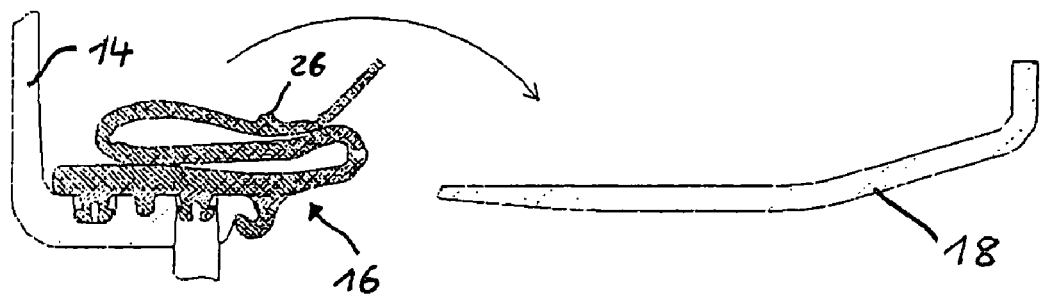
FIG. 4A shows schematically the sealing element of FIG. 3 in its mounting position.

FIG. 4a shows the sealing element 20 in its mounting position, folded via the intended bending points, in which it is held by the peripheral rubber bead 26. In this mounting position the unit comprising the cooling module 10-14 and fitted sealing element 20 forms an extremely compact structure, which allows the cooling module to be installed even in the very confined space in the engine compartment of a motor vehicle.

Figure 4B:
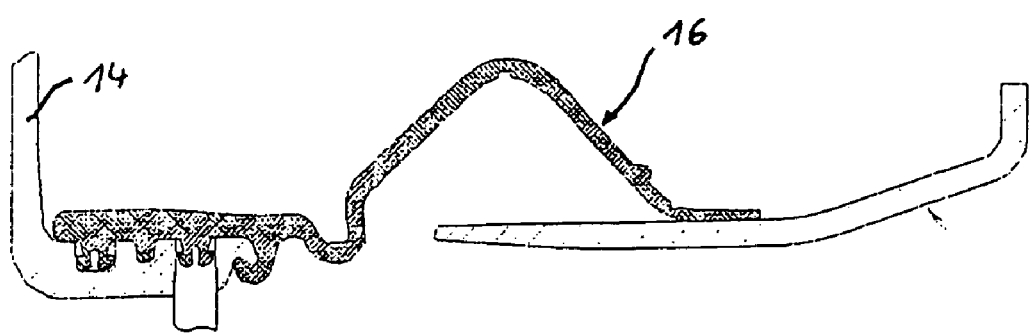
FIG. 4B shows schematically the sealing element of FIG. 3 in its operating position.

Once the cooling module 10-14 has been mounted to the frame, the sealing element 20 which is still in this compact mounting position can then be released in one simple movement, so that the sealing element 20, owing to its inherent bias, automatically springs open into the operating position shown in FIG. 4B. Due also to the radially inward bias of the free end of the sealing element 20, the latter bears on the periphery of the fan housing 18, forming a seal.

Whilst the present invention has been explained in more detail above with reference to various preferred exemplary embodiments, it will be obvious to the person skilled in the art that further variations and modifications, particularly of the sealing element, also come within the scope of the present invention, as defined by the claims attached.

In the exemplary embodiments above the sealing element 20 is in each case attached to the fan cowl 14, fixed to the frame, whilst the free end bears on the fan housing 18 forming a seal. It is equally possible, however, to firmly attach the sealing element 20 to the fan housing 18 and to allow the free end to bear on the fan cowl 14, forming a seal. In this case the structure and the working principle of the sealing element 20 remain substantially the same.

The sealing element 20 according to the second exemplary embodiment above is connected to the fan cowl 14 by means of three projecting elements 28a-c and a hook element 30. The present invention, however, is not limited either to three projecting elements or to the shape of the projecting elements. Thus, for example, just one or two projecting elements having essentially a hook shape may also be engaged in corresponding undercuts of recesses in the fan cowl 14. Where necessary, the hook element 30 of the sealing element 20 and the corresponding hook-shaped projection 34 of the fan cowl 14 are not needed.

Whilst the projecting elements 28a-c of the sealing element 20 in the second exemplary embodiment according to FIG. 3 above snap into the corresponding recesses 32a-c of the fan cowl 14 solely due to the radially inward bias of the sealing element 20, the strength of the connection may be additionally augmented by a suitable adhesive.

What is claimed is:

1. A cooling module arrangement for a motor vehicle including an engine with an axial-flow fan (16), which is connected to the engine and enclosed by a fan housing (18), both the axial-flow fan and the fan housing (18) being fixed to the engine; a radiator (12) mounted to the vehicle and being provided at a side thereof facing the axial-flow fan with a fan cowl (14); and a sealing element (20) composed of an elastic material disposed between, and extending around, the fan housing (18) and the fan cowl (14) for sealing any gap therebetween, the sealing element (20) being fixed to one of two structural components comprising the fan housing (18) and the fan cowl (14) and engaging the other, said sealing element (20) having a pre-installation position in which it is folded back onto the one structural component, but from which the sealing element (20) can be extended by swinging it over to its operating position, in which it bridges the gap between the two structural components (14, 18), the sealing element (20) being provided in the area of its free end with a circumferential bead (26) for increasing the force with which the sealing element (20) is retained in the folded position and, in its operative position, the engagement pressure with the other component.

2. The cooling module arrangement as claimed in claim 1, wherein the sealing element (20) is firmly connected to the one component, by means of hard-soft joining technique.

3. The cooling module arrangement as claimed in claim 1, wherein the sealing element (20) at one end facing the one component, has at least one projecting element (28a-c) which is engaged in a corresponding recess (32a-c) provided in the one component.

4. The cooling module arrangement as claimed in claim 3, wherein the sealing element (20) at its end facing the one component, furthermore has a hook element (30), which engages a corresponding hook-shaped projection (34) provided on the one component for radially supporting the sealing element on the one component.

5. The cooling module arrangement as claimed in claim 1, wherein the sealing element (20) is additionally retained in its mounting position by means of a separate mechanical fixing device.

6. The cooling module arrangement as claimed in claim 1, wherein the sealing element (20) is fixed to the fan cowl (14) and in the operating position bears with its free end on the periphery of the fan housing (18).

* * * * *